United States Patent
Fernandes et al.

(10) Patent No.: US 11,760,813 B2
(45) Date of Patent: Sep. 19, 2023

(54) NATURAL HYDROCOLLOID SYSTEMS FOR PET FOOD COMPOSITIONS, PET FOOD COMPOSITIONS COMPRISING SAME, AND PREPARATIONS THEREOF

(71) Applicant: Société des Produits Nestlé S.A., Vevey (CH)

(72) Inventors: Paulo Alexandre Braga Fernandes, Amiens (FR); Lisa Petit, Amiens (FR)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 19 days.

(21) Appl. No.: 17/479,082

(22) Filed: Sep. 20, 2021

(65) Prior Publication Data
US 2022/0106414 A1    Apr. 7, 2022

Related U.S. Application Data

(60) Provisional application No. 63/086,629, filed on Oct. 2, 2020.

(51) Int. Cl.
| | | |
|---|---|---|
| C08B 37/00 | (2006.01) | |
| A23K 20/163 | (2016.01) | |
| A23K 20/24 | (2016.01) | |
| A23K 50/48 | (2016.01) | |
| A23K 10/20 | (2016.01) | |
| A23K 10/30 | (2016.01) | |

(52) U.S. Cl.
CPC .......... *C08B 37/0003* (2013.01); *A23K 10/20* (2016.05); *A23K 10/30* (2016.05); *A23K 20/163* (2016.05); *A23K 20/24* (2016.05); *A23K 50/48* (2016.05)

(58) Field of Classification Search
CPC .... C08B 37/0003; A23L 33/21; A23L 29/206; A23L 29/20; A23K 20/163
See application file for complete search history.

(56) References Cited

U.S. PATENT DOCUMENTS

| 8,563,069 B2 | 10/2013 | Homsma et al. |
| 2009/0181145 A1* | 7/2009 | Pandey ............... A23L 33/22 |
| | | 426/474 |
| 2011/0293814 A1 | 12/2011 | Alexandre et al. |
| 2020/0196651 A1 | 6/2020 | Burbidge et al. |

FOREIGN PATENT DOCUMENTS

| WO | 2019048715 A2 | 3/2019 |
| WO | 2020170174 A1 | 8/2020 |
| WO | 2020172062 A1 | 8/2020 |

OTHER PUBLICATIONS

H. Douglas Goff and Qingbin Guo, Chapter 1: The Role of Hydrocolloids in the Development of Food Structure, in Handbook of Food Structure Development, 2019, pp. 1-28.*
Souza (Carbohydrate Polymers; 202, 2018, 203-210).*
Dreher, "Dietary Fiber Ingredients and Food Uses", Handbook of Dietary Fiber: An Applied Approach, Jan. 1, 1987, pp. 381-441, XP001119837.
International Search Report and Written Opinion to PCT/IB21/058552 dated Nov. 19, 2021.

* cited by examiner

*Primary Examiner* — Pancham Bakshi
(74) *Attorney, Agent, or Firm* — K&L Gates LLP (57) ABSTRACT

A natural hydrocolloid system can be used in, e.g., pet food compositions. Another aspect of the present disclosure is pet food compositions comprising such a natural hydrocolloid system, and preparation methods thereof. The hydrocolloid system can use blends of fruit fibers, such as citrus and apple fibers, and/or plant-based polysaccharides, such as psyllium, okra, chia, flaxseed, or seaweed; and can provide a gravy and even a jelly with functionalities comparable to the existing gravies. The blends can replace currently used hydrocolloids and can be used in new recipes with natural and clean labels.

22 Claims, 2 Drawing Sheets

NATURAL HYDROCOLLOID SYSTEMS FOR PET FOOD COMPOSITIONS, PET FOOD COMPOSITIONS COMPRISING SAME, AND PREPARATIONS THEREOF

CROSS REFERENCE TO RELATED APPLICATION

This application claims priority to U.S. Provisional Application Ser. No. 63/086,629 filed Oct. 2, 2020 the disclosure of which is incorporated in its entirety herein by this reference.

BACKGROUND

The present disclosure generally relates to compositions and methods that use the synergy of plant-based polysaccharides and fruit fibers for gravies/gels that can be used to produce pet foods, especially wet pet foods.

Many commercially available pet food compositions using hydrocolloid systems, e.g. chunk in jelly cat food compositions, use gelling hydrocolloids such as kappa-carrageenan, alginate, agar or gellan gum alone or in combination for achieving the desired jelly texture for both processing and palatability. Other commercially available pet food compositions use hydrocolloids systems such as guar gum & xanthan gum alone as thickening agents.

Further, pet foods need to be nutritionally complete and should not create any digestion issues. It is known that a significant amount of hydrocolloids in pet food leads to detrimental effects on digestibility (for example, low fecal scores).

Consumers are becoming increasingly concerned about the use of undesirable additives. However, there are currently few natural solutions for reducing the amount of chemical additives such as chemically modified hydrocolloids without detrimental effects on product quality. These defects include sedimentation of chunks in the can, as well as inconsistencies in the amounts of gravy and chunks when the can is filled.

SUMMARY

The inventors have recognized that there is a need to develop natural ingredient alternatives to existing hydrocolloid systems used in wet pet food products that would impart similar or enhanced qualities in terms of product appearance, texture and palatability. Thus, the inventors developed new natural alternatives to replace chemical additives, especially with gelling, thickening and viscosity functions.

The present disclosure generally relates to using the synergy of plant-based polysaccharides' and fruit fibers' properties to develop high viscosity for gravies/gels that can be used to produce pet foods, especially wet pet foods. The developed products and methods provide the same textural properties as the currently available recipes and can be processed in the same way as usual, which avoids new factory equipment or processes. The developed products and methods use natural ingredients, which are not considered as additives, but offer clean labels, and have nutritional and health properties and good consumer acceptance.

Accordingly, in a general embodiment, the present disclosure provides a method of preparing a hydrocolloid system. The method may comprise solubilizing a fruit fiber in water to prepare a fruit fiber solution; solubilizing a plant-based polysaccharide in water to prepare a polysaccharide solution; and mixing the fruit fiber solution and the polysaccharides solution to prepare the hydrocolloid system comprising the fruit fiber and the plant-based polysaccharide. The solubilizing of the fruit fiber and/or the plant-based polysaccharide in water may be conducted with a high shear mixer, for example, at about 5000-7000 rpm. The mixing of the fruit fiber solution and the polysaccharide solution may comprise pouring the fruit fiber solution into the polysaccharide solution. The hydrocolloid system can be sterilized, such as by heat treatment.

In some embodiments, a concentration of the fruit fiber in the fruit fiber solution is from about 0.1 wt % to about 2 wt %, from about 0.75 wt % to about 1.5 wt % or about 1 wt %.

In some embodiments, a concentration of the plant-based polysaccharide in the polysaccharide solution is from about 0.1 wt % to about 1 wt % or from about 0.4 wt % to about 0.5 wt %.

In an embodiment, the fruit fiber comprises at least one of citrus fiber or apple fiber.

In an embodiment, the plant-based polysaccharide comprises at least one of psyllium, okra, seaweed, chia, flaxseed or combinations thereof.

In another embodiment, the plant-based polysaccharide comprises seaweed. In some embodiments, the seaweed comprises at least one of *Eucheuma cottonii, Eucheuma spinosum, Gracilaria verrucosa, Chondrus crispus*, or combinations thereof. In one embodiment the seaweed is *Eucheuma cottonii*.

In an embodiment, the hydrocolloid system further comprises a calcium source.

In another embodiment, the present disclosure provides a hydrocolloid system comprising a fruit fiber and a plant-based polysaccharide.

In another embodiment, the present disclosure provides a method of preparing a pet food composition. The method may comprise preparing a gravy or jelly comprising the hydrocolloid system, preparing food chunks; and mixing food chunks into the gravy or jelly to prepare the pet food composition.

In an embodiment, the pet food composition comprises from about 25 wt % to about 75 wt %, of the gravy or jelly and from about 25 wt % to about 75 wt % of the food chunks. In another embodiment, the pet food composition comprises about 60 wt % of the gravy or jelly and about 40 wt % of the pet food chunks.

In another embodiment, the present disclosure provides a pet food composition comprising a gravy or jelly comprising the hydrocolloid system and food chunks.

An advantage of the present disclosure is to provide natural clean label alternative to commonly used stabilizers and water-binding agents in various food applications.

Another advantage of the present disclosure is to provide clean label alternatives to existing hydrocolloids.

Still another advantage of the present disclosure is to provide a composition, such as a pet food product, that uses clean and natural ingredients.

An additional advantage of the present disclosure is to provide a composition, such as a pet food product, that provides health benefits.

Another advantage of the present disclosure is to provide a composition, such as a pet food product, that is more appealing to consumers.

Another advantage of the present disclosure is to provide a process for preparing a composition, such as a pet food product, that uses clean and natural ingredients.

Yet another advantage of the present disclosure is to provide a process for preparing a compositions, such as a pet food product, that provides health benefits.

Additional features and advantages are described in, and will be apparent from, the following Detailed Description and the Figures.

DETAILED DESCRIPTION

All percentages are by weight of the total weight of the composition unless expressed otherwise. Similarly, all ratios are by weight unless expressed otherwise. When reference is made to the pH, values correspond to pH measured at 25° C. with standard equipment. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used herein and in the appended claims, the singular form of a word includes the plural, unless the context clearly dictates otherwise. Thus, the references "a," "an" and "the" are generally inclusive of the plurals of the respective terms. For example, reference to "an ingredient" or "a method" includes a plurality of such "ingredients" or "methods." The term "and/or" used in the context of "X and/or Y" should be interpreted as "X," or "Y," or "X and Y."

Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. Where used herein, the term "example," particularly when followed by a listing of terms, is merely exemplary and illustrative, and should not be deemed to be exclusive or comprehensive. Any embodiment disclosed herein can be combined with any other embodiment disclosed herein unless explicitly indicated otherwise.

All percentages expressed herein refers to total weight % in the gravy, sheared gel gravy, pet food composition, or chunk-in-jelly pet food composition, as specified in the description. The final composition includes water unless specified otherwise. The recipes in the examples illustrate how wt. % is to be understood by the skilled person in the art. An "amount" can be the total amount of the referenced component per serving of the composition or per distinct unit of the composition and/or can be the weight percentage of the referenced component by dry weight. Moreover, an "amount" includes zero; for example, the recitation of an amount of a compound does not necessarily mean that the compound is present, unless followed by a range that excludes zero.

"Animal" includes, but is not limited to, mammals, which includes but is not limited to, rodents, aquatic mammals, domestic animals such as dogs and cats, farm animals such as sheep, pigs, cows and horses, and humans. Where "animal," "mammal" or a plural thereof is used, these terms also apply to any animal that is capable of the effect exhibited or intended to be exhibited by the context of the passage.

The terms "food," "food product" and "food composition" mean a product or composition that is intended for ingestion by an animal and provides at least one nutrient to the animal. Further in this regard, these terms mean that the product or composition is in a form ready for consumption and is not merely an intermediate from which a consumable product or composition is made, although other food compositions can be added in some embodiments. The term "pet food" or "pet food composition" means any food composition intended to be consumed by a pet. The term "pet" means any animal which could benefit from or enjoy the compositions provided by the present disclosure. For example, the pet can be an avian, bovine, canine, equine, feline, hircine, lupine, murine, ovine, or porcine animal, but the pet can be any suitable animal. The compositions of the present disclosure, including the many embodiments described herein, can comprise, consist of, or consist essentially of the essential elements and limitations described herein, as well as any additional or optional ingredients, components, or limitations described herein or otherwise useful in a diet.

As used herein, "complete nutrition" contains sufficient types and levels of macronutrients (protein, fats and carbohydrates) and micronutrients to be sufficient to be a sole source of nutrition for the animal to which the composition is administered. Individuals can receive 100% of their nutritional requirements from such complete nutritional compositions. The term "complete and balanced" when referring to a food composition means a food composition that contains all known required nutrients in appropriate amounts and proportions based on recommendations of recognized authorities in the field of animal nutrition, and are therefore capable of serving as a sole source of dietary intake to maintain life or promote production, without the addition of supplemental nutritional sources. Nutritionally balanced pet food and animal food compositions are widely known and widely used in the art, e.g., complete and balanced food compositions formulated according to standards established by the Association of American Feed Control Officials (AAFCO).

"Wet food" means a pet food having a moisture content from about 50% to about 90%, and 30 in one aspect, from about 70% to about 90%. "Dry food" means a pet food having a moisture content less than about 20%, and in one aspect, less than about 15%, and in a specific aspect, less than about 10%. "Semi-moist food" means a pet food having a moisture content from about 20% to about 50%, and in one aspect, from about 25% to about 35%.

"Gravy" refers to a viscous liquid that becomes a jelly after heat treatment and upon cooling. The term "chunk-in-jelly" as used herein refers to a food product composed of food chunks and mixed with a jelly in an approximately ratio of from 25/75 to about 60/40. "Hydrocolloid system" as used herein refers to gravies, jellies and other semi-solid compositions. The term "semi-solid" as used herein refers to a material whose physical properties lie between that of a liquid and that of a solid.

The term "chunk-in-jelly pet food composition" as used herein refers to a pet food product composed of food chunks and mixed with a jelly in an approximately ratio of from 25/75 to about 60/40.

The term "mechanically disrupted seaweed" as used herein typically refers to ground seaweed, milled seaweed, cut seaweed. Preferably, the maximum average longest diameter of each seaweed piece after grinding, milling, or cutting is between 150 micron and 3 mm. The seaweed is water-washed, as opposed to carrageenan and/or semi-refined carrageenan which are both chemically modified, for example alkali-treated. Mechanically disrupted seaweed is not chemically modified.

The term "potassium source" refers to any compound containing ionic potassium. In one embodiment, the potassium source can be selected from the group consisting of potassium chloride, potassium sulphate, potassium carbonate, and mixtures thereof.

The term "calcium source" refers to any compound containing ionic calcium. In one embodiment, the calcium source can be selected from the group consisting of calcium chloride, calcium carbonate, and mixtures thereof.

The term "receptacle" as used herein may refer to a can, a pouch, or a tray.

The term "vegetable protein" refers to a protein derived from a vegetable as known in the art. In one embodiment, the vegetable protein is selected from the group consisting of wheat gluten, pea protein, egg protein, soy protein, and mixtures thereof. The The term "syneresis" refers to the phenomenon where the polysaccharide hydrogel spontaneously expels water from its structure.

The term "stickiness" as used herein refers to the ability of a gravy or jelly to adhere other components of the composition. Stickiness was empirically evaluated by testing the solution with fingers. It was rated on a scale of 1 to 5, with 1 being not sticky and 5 being very sticky.

The term "gel" means a solid or semi-solid matrix formed by interaction with one or more polysaccharides and water, and is free standing over a time scale of at least a few minutes and deforms partially in an elastic way when submitted to a deformation force (elastic gel). A brittle gel is a gel that breaks (rather than partially deforms) when pressure is applied. In more technical terms the gel point is achieved when G' (storage modulus)=G" (viscous modulus) at a frequency of 1 Hz and a composition achieves gel structure when G'>G" at a frequency of 1 Hz.

In the present description, meat and meat byproducts used as food chunks are understood to mean all the fleshy parts of slaughtered warm-blooded animals in the fresh state or preserved by an appropriate treatment and all the products and by-products arising from the processing of the bodies or body parts of warm-blooded animals. Meat is understood to mean in particular the meat from chickens, rabbits, bovines or ovines and offal. Offal is understood to mean lung lobes as well as livers or kidneys. Meat by-products is understood to mean the meal obtained from carcasses of the above mentioned animals. In the present description, fish and fish by-products will be regarded as coming within the definition of meat and meat byproducts. Fish and fish by-products are understood to mean fish or fish parts in the fresh state or preserved by an appropriate treatment, as well as the byproducts of their processing. Salmon or sardines can be used as fish and fish meal can be used as by-products.

Embodiments discussed herein can be used interchangeably between products and processes. For example, a hydrocolloid thickener discussed in the context of a process, e.g., a process for making a hydrocolloid system or making a chunk-in-jelly formulation, can be also used in the context of a product, e.g., a gravy, chunk-in-jelly, or hydrocolloid system.

The compositions disclosed herein may lack any element that is not specifically disclosed herein. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified. Any embodiment disclosed herein can be combined with any other embodiment disclosed herein unless explicitly and directly stated otherwise.

Unless defined otherwise, all technical and scientific terms and any acronyms used herein have the same meanings as commonly understood by one of ordinary skill in the art in the field of the invention. Although any compositions, methods, articles of manufacture, or other means or materials similar or equivalent to those described herein can be used in the practice of the present invention, the preferred compositions, methods, articles of manufacture, or other means or materials are described herein.

An aspect of the present disclosure is a method of preparing a hydrocolloid system. The method may comprise solubilizing a fruit fiber in water to prepare a fruit fiber solution; solubilizing a plant-based polysaccharide in water to prepare a polysaccharide solution; and mixing the fruit fiber solution and the polysaccharides solution to prepare the hydrocolloid system comprising the fruit fiber and the plant-based polysaccharide. The solubilizing of the fruit fiber and/or the plant-based polysaccharide in water may be conducted with a high shear mixer, for example, at about 5000-7000 rpm. The mixing of the fruit fiber solution and the polysaccharide solution may comprise pouring the fruit fiber solution into the polysaccharide solution. The hydrocolloid system can be sterilized, such as by heat treatment. After sterilization (retorting), the viscosity gelling properties and other properties remained functional.

Alternatively, a method of preparing a hydrocolloid system may comprise solubilizing a fruit fiber and a plant-based polysaccharide in the same water and mixing with a high shear mixer, for example at about 5000-7000. The water may be cold water or hot water. The resultant solution can be boiled for 5-10 minutes.

The prepared hydrocolloid system may have a viscosity of above 2000 mPa·s, from 2000 to 6000 mPa·s, such as from 2000 to 4000 mPa·s, from 3000 to 5000 mPa·s, from 4000 to 6000 mPa·s, from 2000 to 3000 mPa·s, from 3000 to 4000 mPa·s, from 4000 to 5000 mPa·s, from 5000 to 6000 mPa·s, from 2000 to 2500 mPa·s, from 2500 to 3000 mPa·s, from 3000 to 3500 mPa·s, from 3500 to 4000 mPa·s, from 4000 to 4500 mPa·s, from 4500 to 5000 mPa·s, from 5000 to 5500 mPa·s, from 5500 to 6000 mPa·s, from 6000 to 6500 mPa·s, from 6500 to 7000 mPa·s, from 7000 to 7500 mPa·s, from 7500 to 8000 mPa·s, from 8000 to 8500 mPa·s. from 8500 to 9000 mPa·s, from 9000 to 9500 mPa·s, from 9500 to 10,000 mPa·s.

In some embodiments, when the hydrocolloid system is used in a chunk and jelly or chunk and gravy product, the desired viscosity depends upon the container filling process. For example, when using a 2-step filling process it may be desirable to have a viscosity below 2000 mPa·s or below 1000 mPa·s. In the 2-step filling process, the chunk composition is placed in the container first followed by addition of the gravy or jelly composition. The less viscous composition allows for ease of flow. In a 1-step filling process, the chunk and gravy or chunk and jelly is combined and mixed prior to filling the container. In this embodiment, it is desirable to have the gravy or jelly of a similar viscosity to the chunks, therefore a viscosity >2000 mPa·s may be preferable.

The concentration of the fruit fiber in the fruit fiber solution may be from about 0.1 wt % to about 2 wt %, such as about 1.5 wt % or about 2 wt %, from about 0.75 wt % to about 1.5 wt %, or about 1 wt %. The concentration of the plant-based polysaccharide in the polysaccharide solution may be from about 0.1 wt % to about 1 wt %, such as from about 0.4 wt % to about 0.5 wt %, about 0.4 wt %, or about 0.5 wt %.

The fruit fiber may be solubilized in a cold water. The temperature of the cold water may be from about 15° C. to about 30° C., such as 25° C. The plant-based polysaccharide may be solubilized in a hot water. The temperature of the hot water may be from about 70° C. to about 90° C., such as 80° C. Alternatively, the fruit fiber and plant-based polysaccharide may be solubilized in the same water, cold or hot.

The fruit fiber may comprise at least one of citrus fiber or apple fiber. In some embodiments, the fruit fiber comprises citrus fiber. The plant-based polysaccharide may comprise at least one of psyllium, okra, seaweed, chia, flaxseed, or combinations thereof.

In some embodiments, the plant-polysaccharide comprising psyllium, okra, seaweed, chia, flaxseed, or combinations thereof may further comprise a starch, such as tapioca starch, corn starch, wheat starch, or rice starch.

In one embodiment, the plant-based polysaccharide comprises seaweed. In some embodiments, the seaweed comprises at least one of *Eucheuma cottonii, Eucheuma spinosum, Gracilaria verrucosa, Chondrus crispus*, or combinations thereof. In one embodiment, the seaweed is *Eucheuma cottonii*.

The seaweed may be mechanically disrupted. The concentration of the seaweed in the polysaccharide solution may be from about 0.1 wt % about 2 wt %, about 0.15 wt % to about 0.5 wt %, about 0.15 wt %, or about 0.5 wt %.

In one embodiment, the plant-based polysaccharide comprises seaweed and starch, such as tapioca starch. The concentration of the tapioca starch in the polysaccharide solution may be from about 0.1 wt % to about 1 wt %, such as 0.5 wt %.

In one embodiment, the plant-based polysaccharide comprises seaweed, such as at least one of *Eucheuma cottonii, Eucheuma spinosum, Gracilaria verrucosa, Chondrus crispus*, or combinations thereof.

The polysaccharide solution may comprise a calcium source. In some embodiments, the concentration of the calcium source in the polysaccharide solution is from about 0.1 wt % to about 1 wt %, such as about 0.2-0.8 wt %, about 0.3-0.7 wt %, about 0.4-0.6 wt %, or about 0.5 wt %. In some embodiments, the calcium source comprises $CaCl_2$) or $CaCO_3$. In one embodiment, the polysaccharide solution comprises psyllium and the calcium source, such as $CaCO_3$.

In one embodiment, the plant-based polysaccharide comprises psyllium.

In some embodiments, when psyllium is present in the polysaccharide solution, the concentration of the psyllium in the polysaccharide solution is from about 0.1 wt % to about 1 wt %, such as about 0.75 wt % or about 0.5 wt %.

In one embodiment, the plant-based polysaccharide comprises okra. In some embodiments, the concentration of the okra in the polysaccharide is from about 0.1 wt % to about 2 wt %, such as about 0.5 wt %, about 1 wt %, about 2 wt %, about 0.5-1 wt %, about 1-2 wt %, or about 0.5-1.5 wt %.

In some embodiments, In some embodiments, the concentration of the potassium source in the hydrocolloid system is from about 0.1 wt % to about 2 wt %, such as about 0.17 wt %. In one embodiment, the potassium source comprises potassium chloride. In another embodiment, the potassium source comprises $K_2CO_3$.

Another aspect of the present disclosure is a hydrocolloid system comprising the fruit fiber and the plant-based polysaccharide disclosed herein. The hydrocolloid system can be prepared as disclosed herein.

In some embodiments, the fruit fiber comprises at least one of citrus fiber or apple fiber. In one embodiment, the fruit fiber consists essentially of citrus fiber or apple fiber. In one embodiment, the fruit fiber comprises citrus fiber.

In some embodiments, the plant-based polysaccharide comprises at least one of psyllium, okra, seaweed, chia, flaxseed, or combinations thereof. In another embodiment, the plant-based polysaccharide consists essentially of psyllium, okra, seaweed, chia, flaxseed, or combinations thereof.

In one embodiment, the plant-based polysaccharide comprises seaweed. In some embodiments, the seaweed comprises at least one of *Eucheuma cottonii, Eucheuma spinosum, Gracilaria verrucosa, Chondrus crispus*, or combinations thereof. In another embodiment, the seaweed consists essentially of *Eucheuma cottonii, Eucheuma spinosum, Gracilaria verrucosa, Chondrus crispus*, or combinations thereof. In another embodiment, the seaweed may be mechanically disrupted In one embodiment, the plant-based polysaccharide comprises seaweed and starch, such as tapioca starch.

In one embodiment, the hydrocolloid system comprises a calcium source. In some embodiments, the calcium source comprises $CaCO_3$ or $CaCl_2$). In some embodiments, the plant-based polysaccharide comprises psyllium and the calcium source, such as $CaCO_3$.

In one embodiment, the plant-based polysaccharide comprises psyllium.

In one embodiment, the plant-based polysaccharide comprises okra.

In some embodiments, the hydrocolloid system comprises a potassium source. In one embodiment, the potassium source comprises potassium chloride. In another embodiment the potassium source comprises potassium carbonate.

In one embodiment, the hydrocolloid system has a viscosity of above 2000 millipascal second (mPa·s). In one embodiment, the viscosity is from about 2000 to about 6000 mPa·s, such as from about 2000 to about 4000 mPa·s, from about 3000 to about 5000 mPa·s, from about 4000 to about 6000 mPa·s, from about 2000 to about 3000 mPa·s, from about 3000 to about 4000 mPa·s, from about 4000 to about 5000 mPa·s, from about 5000 to about 6000 mPa·s, from about 2000 to about 2500 mPa·s, from about 2500 to about 3000 mPa·s, from about 3000 to about 3500 mPa·s, from about 3500 to about 4000 mPa·s, from about 4000 to about 4500 mPa·s, from about 4500 to about 5000 mPa·s, from about 5000 to about 5500 mPa·s, from about 5500 to 6000 about mPa·s, from 6000 to 6500 mPa·s, from 6500 to 7000 mPa·s, from 7000 to 7500 mPa·s, from 7500 to 8000 mPa·s, from 8000 to 8500 mPa·s, from 8500 to 9000 mPa·s, from 9000 to 9500 mPa·s, from 9500 to 10,000 mPa·s.

In some embodiments, the hydrocolloid system is used in a 2-step filling process and has a viscosity of less than about 2000 mPa·s or less than about 1000 mPa·s. In another embodiment, the hydrocolloid system is used in a 1-step filling process and has a viscosity of above 2000 mPa·s. In another embodiment, the hydrocolloid is used in a 1-step filling process and has a viscosity from about 3000 mPa·s to about 5000 mPa·s.

Another aspect of the present disclosure is a method of preparing a pet food composition. In one embodiment, the method comprises preparing a gravy or jelly comprising the hydrocolloid system as disclosed herein; preparing food chunks; and mixing food chunks into the gravy or jelly to prepare the pet food composition. In another embodiment, the pet food composition is then be filled into a receptacle, which may then be retorted. In one embodiment, the pet food composition is a chunk-in-jelly pet food composition. In another embodiment, the pet food composition is a chunk-in-gravy pet food composition.

Yet another aspect of the present disclosure is a pet food composition. The pet food composition may be prepared as disclosed herein. The pet food composition may comprise a gravy or jelly comprising the hydrocolloid system disclosed herein and food chunks.

In some embodiments, the pet food composition comprises from about 25 wt % to about 75 wt % of the gravy or jelly and from about 25 wt % to about 75 wt % of the food chunks. In one embodiment, the pet food composition comprises about 60 wt % of the gravy or jelly and about 40 wt % of the food chunks.

The food chunks may be selected from the group consisting of meat, gluten, a vegetable protein source, and mixtures thereof.

Natural dietary fibers, such as citrus and apple fibers, composed of soluble and insoluble (mainly cellulose and pectin) fibers. Citrus fiber is a natural clean label alternative to commonly used stabilizers and water-binding agents in various food applications such as bakery, meat, dairy products, beverages, sauces and desserts. Viscosity and structure provided by fiber suspensions come from entanglements and interactions between well dispersed individual fibers. Stabilizing properties of citrus fiber depend greatly on creating larger surface area which in turn results in smaller pores and hold the water in place. Therefore, functional attributes of citrus fiber are greatly dependent on dispersion and activation. The hydrocolloid systems disclosed herein may be clean label alternatives to existing hydrocolloids, as they achieved the highest viscosity and water holding capacity, after activation by high shear mixer.

EXAMPLES

Example 1-1: Raw Materials

Citrus fiber and apple fiber from HERBAFOOD (Germany) were used as raw materials and included HERBACEL AQ PLUS CITRUS 01 (powder), HERBACEL AQ PLUS CITRUS 07 (powder), HERBACEL PLUS CITRUS N (powder), HERBACEL AQ PLUS CITRUS F (powder), HERBACEL AQ PLUS APPLE 09 (powder).

Psyllium, P95T VITACEL, was purchased from JRS RETTENMAIER

Seaweed raw material included MARCEL *Eucheuma cottonii* (flakes, 590 mM) and NUWEN *Chondrus crispus* (powder). Tapioca starch powder from AVEBE was used.

Solutions of citrus and apple fiber ingredients were prepared in cold water at 1 wt %, 1.5 wt %, and 2 wt % and the viscosity (cps) over time was measured at time 0, 1 hour, and 12 hours using a Brookfield RVT viscosimeter at 20 rpm and 25° C. The results are presented in Table 1a.

TABLE 1a

| | Concentration | | | | | | | | |
|---|---|---|---|---|---|---|---|---|---|
| | 1% | | | 1.5% | | | 2% | | |
| Viscosity (cps) | t = 0 | t = 1 h | t > 12 h | t = 0 | t = 1 h | t > 12 h | t = 0 | t = 1 h | t > 12 h |
| HERBACEL AQ PLUS CITRUS N01 | 1400 | 1700 | 2200 | — | — | — | 5700 | 7600 | 7700 |
| HERBACEL AQ PLUS CITRUS N07 | 1600 | 2300 | 2600 | — | — | — | 6700 | 8600 | 9500 |
| HERBACEL AQ PLUS CITRUS N | 1700 | — | 2500 | — | — | — | 7250 | 9400 | 9800 |
| HERBACEL AQ PLUS CITRUS F | 1200 | 1500 | 2300 | 2700 | 2800 | 3200 | 6700 | 7600 | 8700 |
| HERBACEL AQ PLUS APPLE N09 | 1600 | 2300 | — | — | — | — | 4500 | 8400 | 6700 |

The citrus and apple fiber presented a texture similar to apple puree. The compositions were viscous and not sticky. The citrus fiber had a light yellow color and did not have a strong odor. The apple fiber composition was brown in color, similar to a caramel coloring and had an apple odor. The viscosity and color of the compositions make them good replacements for the chemically modified hydrocolloid systems currently used for food applications.

Example 1-2: Citrus Fiber, Psyllium and Combinations Thereof with and without CaCl$_2$) or KCl Compositions comprising citrus fiber, psyllium and combinations thereof were prepared with and without calcium chloride or potassium chloride. Generally, the compositions were prepared by adding the powder(s) in hot water (80° C.) and mixing at high shear for 3 minutes. The viscosity of each sample was measured using a Brookfield RVT viscosimeter (20 rpm, 25° C., spindles 4 or 5) on the day of preparation (D) and the day after preparation (D+1).

TABLE 1b

| | Viscosity D | Viscosity D + 1 | pH | T (° C.) | Stickiness |
|---|---|---|---|---|---|
| 1.5% Citrus Fiber N | 250 | 600 | 6.38 | 26.3 | 1 |
| 1.5% Citrus Fiber N + 0.1% CaCl$_2$ | 750 | 3000 | 6.2 | 25.6 | 1 |

TABLE 1b-continued

|  | Viscosity D | Viscosity D + 1 | pH | T (° C.) | Stickiness |
|---|---|---|---|---|---|
| 0.75% Psyllium | 1000 | 1900 | 6.81 | 25.4 | 3 |
| 0.75% Psyllium + 0.1% CaCl$_2$ | 700 | 900 | 6.73 | 25.6 | 5 |
| 1% Psyllium + 0.2% KCl | 4500 | — | — | — | 3 |
| 0.75% Citrus Fiber N + 0.75% Psyllium | 2300 | 2000 | 6.45 | 25.8 | 4 |
| 0.75% Citrus Fiber N + 0.75% Psyllium + CaCl$_2$ | 1500 | 3000 | 6.18 | 25.5 | 3 |
| 1% Citrus Fiber + 1% Psyllium | 15000 | — | — | — | 4 |

Blends of citrus fiber and psyllium have a higher viscosity than either ingredient alone. Calcium chloride addition increases the viscosity of the compositions in some instances and potassium chloride provides an even greater boost to viscosity.

Example 1-3: Preparation of Chunk-In-Gravy Compositions

Each of the compositions in Table 1b was used as a gravy for a chunk-in-gravy composition. The chunk component of the chunk and gravy was obtained by washing and drying the chunks from commercially purchased chunk and gravy product (e.g. PURINA GOURMET PERLE).

After the gravy and chunks were prepared as described above, the chunks and gravy were combined and mixed. Cans were filled with the composition and weighed, lidded and sealed and retorted for 45 min at 120° C. Each can had a weight of 85 g (+/−1 g) with 60% gravy (51 g) and 40% chunks (34 g).

Figure 1:
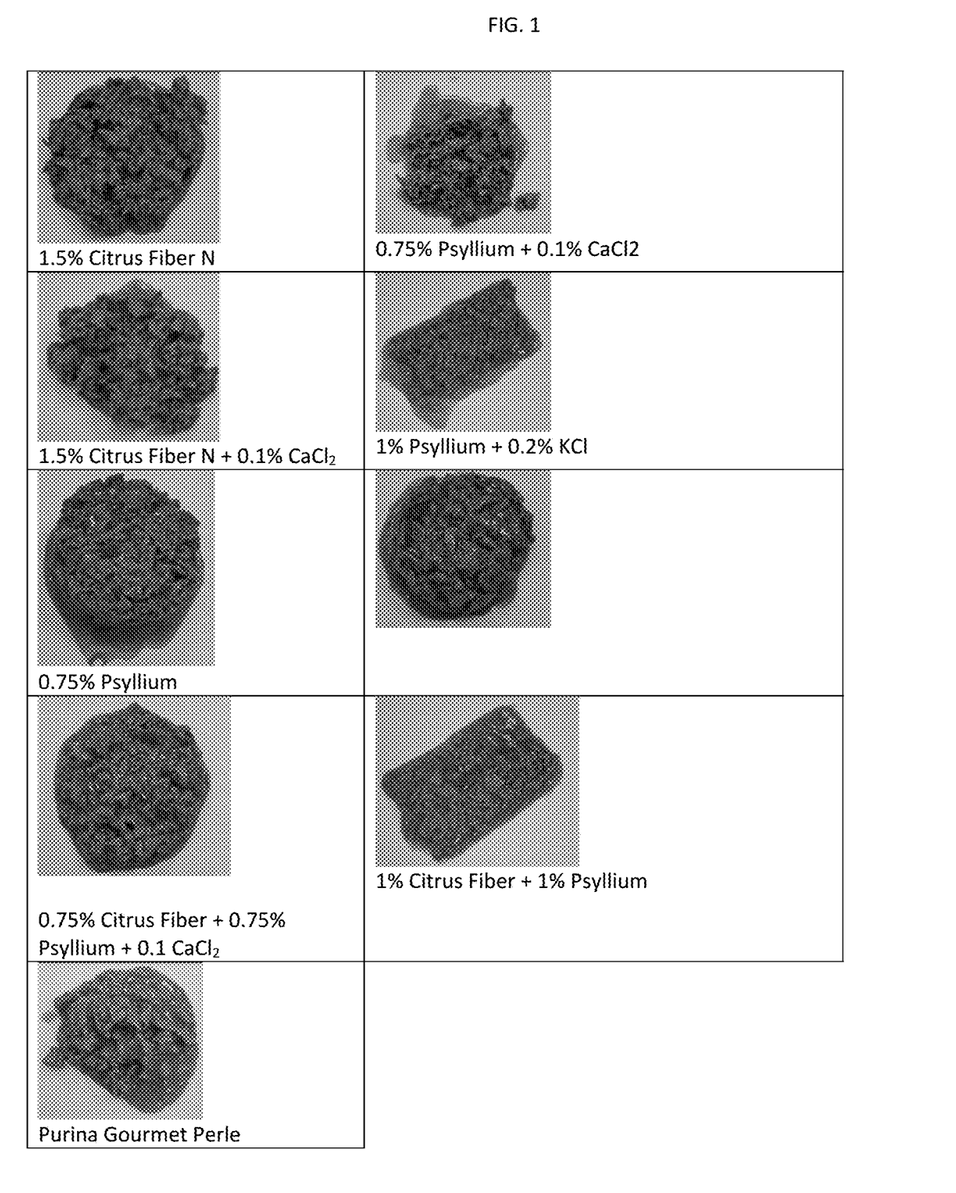
FIG. 1 shows chunk in gravy products comprising citrus fiber, psyllium and combinations thereof with and without $CaCl_2$) and KCl.

The combination of citrus fiber and psyllium provided a homogeneous shiny product with a good cosmetic with the gravy sticking to the chunks, with no syneresis or only slight syneresis. See FIG. 1.

Most of the blends of citrus fiber and psyllium were similar or improved when compared to the commercial gravy products composed of guar and xanthan. The blends not only provided sufficient viscosity (>1000), but also had a sticky character and formed a gel depending upon the parameters.

Example 1-4: Citrus Fiber, Psyllium and Combinations Thereof with Starch

Compositions comprising citrus fiber, psyllium and combinations thereof were prepared with starch. Generally, the compositions were prepared by adding the powders in hot water (80° C.) and mixing at high shear for 3 minutes. The viscosity of each sample was measured using a Brookfield RVT viscosimeter (20 rpm, 25° C., spindles 4 or 5) on the day of preparation (D) and the day after preparation (D+1). The results are presented in Table 1c.

TABLE 1c

|  | Viscosity D | Viscosity D + 1 | pH | T (° C.) | Stickiness |
|---|---|---|---|---|---|
| 1.5% Citrus Fiber N + 0.5% starch | 3500 | 5500 | 6.13 | 44.9 | 5 |
| 1.5% Citrus Fiber N + 0.5% starch | 4000 | — | — | — | 4 |
| 0.75% Citrus Fiber N + 0.75% Psyllium + 0.5% starch | 3800 | 6000 | 6.09 | 49.3 | 4 |
| 0.75% Citrus Fiber N + 0.75% Psyllium + 0.5% starch | 6500 | — | — | — | 4 |

The addition of starch to the blend increased viscosity while also providing stickiness and/or reducing syneresis.

Example 1-5: Citrus Fiber, Seaweed and Combinations Thereof with and without KCl and/or CaCl$_2$ Compositions comprising citrus fiber and seaweed were prepared with and without CaCl$_2$) and/or KCl. Generally, the compositions were prepared by adding the citrus fiber to cold water (25° C.) and adding the seaweed powders to hot water (80° C.) and mixing each at high shear for 3 minutes. The cold solution (60% total final solution) was added to the hot solution (40% total final solution) and blending with a whisk. The viscosity of each sample was measured using a Brookfield RVT viscosimeter (20 rpm, 25° C., spindles 4 or 5) on the day of preparation (D) and the day after preparation (D+1). The results are presented in Table 1d.

TABLE 1d

|  | Viscosity D | Viscosity D + 1 | pH | T (° C.) | Stickiness |
|---|---|---|---|---|---|
| 1% Citrus Fiber + 0.4% C. crispus | 200 | 100 | 6.76 | 32.9 | 2 |
| 1% Citrus Fiber + 0.4% C. crispus + 0.15% KCl | 50 | 350 | 6.83 | 25.9 | 2 |
| 1% Citrus Fiber + 0.4% C. crispus + 0.15% KCl + 0.15% CaCl$_2$ | 50 | 5000 | 6.49 | 29.2 | 2 |
| 1% Citrus Fiber + 0.4% E. cottonii | 400 | 300 | 6.7 | 29 | 4 |
| 1% Citrus Fiber + 0.4% E. cottonii + 0.15% KCl | 250 | 2800 | 6.55 | 26.3 | 4 |
| 1% Citrus Fiber + 0.4% E. cottonii + 0.15% KCl + 0.15% CaCl$_2$ | 2700 | 18000 | 6.12 | 31 | 3.5 |
| 1% Citrus Fiber + 0.2% E. cottonii | 500 | 4000 | 6.8 | 29.3 | 3 |
| 1% Citrus Fiber + 0.2% E. cottonii + 0.15% CaCl$_2$ | 1300 | — | — | — | 3 |
| 1% Citrus Fiber + 0.4% E. spinosum | 150 | 200 | 6.81 | 26.9 | 2 |
| 1% Citrus Fiber + 0.4% E. spinosum + 0.15% KCl | 300 | 200 | 6.53 | 26.2 | 3 |
| 1% Citrus Fiber + 0.4% E. spinosum + 0.15% KCl + 0.15% CaCl$_2$ | 100 | 1000 | 6.3 | 29.7 | 1 |
| 1% Citrus Fiber + 0.4% E. spinosum 0.15% CaCl$_2$ | 450 | 5400 | 6.36 | 30.1 | 2 |

Potassium chloride and calcium chloride provided an increase in D+1 viscosities for blends of citrus fiber and red seaweed in most instances. At least one example, 1% citrus fiber+0.2% *E. cottonii*+0.15% CaCl$_2$, provides support that addition of calcium chloride may allow for a reduction in the quantity of seaweed needed.

Figure 2:
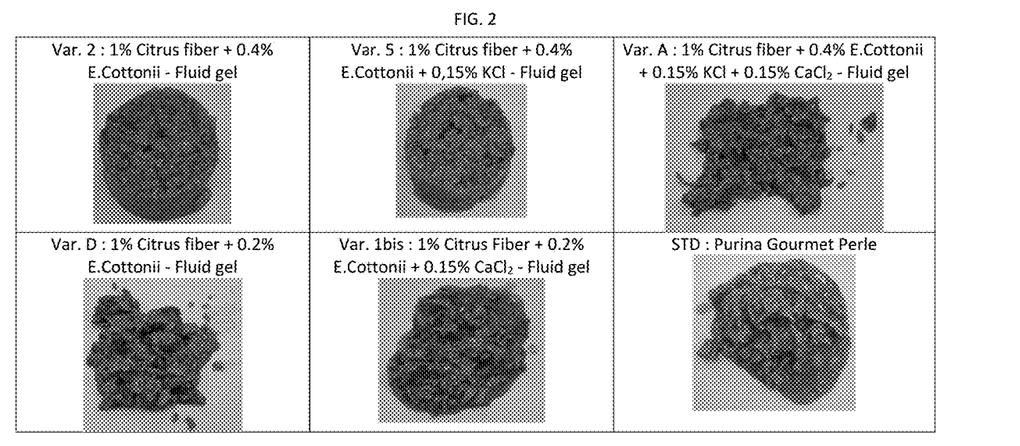
FIG. 2 shows chunk in gravy products comprising citrus fiber and red seaweed combinations with and without $CaCl_2$) and KCl.

The compositions listed in Table 1d were also used to prepare chuck and gravy products. The products were prepared as previously described and evaluated for their cosmetic properties. All seaweed and citrus fiber combinations (with or without CaCl$_2$ or KCl) provided a good cosmetic, with gravy sticking to the chunks and no syneresis. FIG. 2.

Example 1-5: Citrus Fiber, Psyllium and Seaweed Combinations

Combinations of citrus fiber, psyllium and seaweed were prepared. The viscosity, stickiness, and gel formation were evaluated. The results are shown in Table 1e.

TABLE 1e

|  | Viscosity D | Viscosity D + 1 | pH | T (° C.) | Stickiness |
|---|---|---|---|---|---|
| 0.75% Citrus fiber + 0.5% Psyllium + 0.4% *C. Crispus* | 2250 | — | — | — | 5 |
| 0.75% Citrus fiber + 0.5% Psyllium + 0.2% *E. Cottonii* | 4000 | — | — | — | 4 |
| 0.75% Citrus fiber + 0.5% Psyllium + 0.4% *E. Spinosum* | 2600 | — | — | — | 4 |
| 0.75% Citrus fiber + 0.75% Psyllium + 0.4% *C. Crispus* | 8500 | 6000 | 7.32 | 36.4 | 5 |
| 0.75% Citrus fiber + 0.75% Psyllium + 0.4% *E. Cottonii* | 8500 | 19000 | 6.35 | 37 | 5 |
| 0.75% Citrus fiber + 0.75% Psyllium + 0.4% *E. Spinosum* | 8000 | 5000 | 6.32 | 35.9 | 5 |
| 1% Citrus fiber + 0.25% Psyllium + 0.4% *C. Crispus* | 1700 | 4000 | 6.48 | 36.4 | 4 |
| 1% Citrus fiber + 0.25% Psyllium + 0.4% *E. Spinosum* | 1600 | 4500 | 6.57 | 36.1 | 3 |

Citrus fiber, psyllium and seaweed blends resulted in composition with high viscosity and stickiness. The composition with equal concentrations of citrus fiber and psyllium gave some of the highest viscosities. Overall, the blends of citrus fiber, psyllium and red seaweed provided viscosity (texture), a sticky character, with little to no syneresis and formed a gel depending upon the parameters. Consequently, the blend can be used for a new generation of hydrocolloid feed material with clean label and nutritional claims.

Chunk in gravy products using the compositions listed in Table 1e were prepared as previously described. All compositions provided cosmetic results comparable to the commercial standard.

Example 2-1: Raw Materials

Commercial citrus fiber obtained from dried lime pulp was purchased from HERBAFOOD. *Eucheuma cottonii*, a red seaweed from the Philippines, was purchased from MARCEL. *Chondrus crispus*, a red seaweed from France, was purchased from NUWEN. Psylllium P95 Vitacel, from the seed husk of *Plantago ovata*, was purchased from JRS. Okra NIG0052 (Okra A) was purchased from HARM FOODS. Okra ING6038 (Okra B) was obtained from NESTLE. Flaxseed (ING5079), from *Linum usitatissimum* seeds, and Chia (ING5134) from *Salvia hispanica*, and Okra extract were obtained from NESTLE.

Citrus fiber and polysaccharide solutions were prepared by solubilizing the powder of each raw material in cold (20-25° C.) or hot (80° C.) water using a Silverson high shear mixer for 3 in at a speed of about 5000-7000 rpm. The viscosity of each solution was measured using a Brookfield RVT viscosimeter (20 rpm, 25° C., spindle 4).

Table 2a shows the results of the viscosity measurements for 2 different citrus fiber samples at different concentrations solubilized in cold (~25° C.) and hot water (~80° C.).

TABLE 2a

|  | 1.5 wt % Cold | | | 2 wt % Cold | | | 2 wt % Hot | | |
|---|---|---|---|---|---|---|---|---|---|
|  | t0 | t =+ 1 h | t =+ 36 | t0 | t =+ 1 h | t =+ 36 | t0 | t =+ 1 h | t =+ 36 |
| Citrus Fiber N | 700 | 1500 | 600 | 4000 | 4000 | 4500 | — | 4000 | 4500 |
| Citrus Fiber F | — | — | — | 3300 | 2700 | 4000 | — | 4500 | — |

Table 2b shows the results of the viscosity measurements, as well as sensory properties of okra, flaxseed and chia seed solubilized in cold (~25° C.) and hot water (~80° C.).

TABLE 2b

|  | 1% (cold) | | 4% (cold) | | 4% (hot) | | Stickiness | Color | Odor |
|---|---|---|---|---|---|---|---|---|---|
|  | t0 | t =+ 5 h | t0 | t =+ 5 h | t0 | t =+ 5 h |  |  |  |
| Okra A | 100 | 100 | 2500 | 2700 | 1700 | 2200 | 3/5 | Brown-green solution | Herbal tea cereal |

TABLE 2b-continued

|  | 1% (cold) | | 4% (cold) | | 4% (hot) | | Stickiness | Color | Odor |
| --- | --- | --- | --- | --- | --- | --- | --- | --- | --- |
|  | t0 | t =+ 5 h | t0 | t =+ 5 h | t0 | t =+ 5 h |  |  |  |
| Okra B | 900 | 600 | 3000 | 2200 | 700 | 600 | 3/5 | Dark green solution | cereal |
| Flaxseed | 0 | 0 | 1300 | 1700 | 2700 | 4900 | 2/5 | Light grey solution | Cut grass (light) |
| Chia | 0 | 0 | 2700 | 2700 | 2700 | 3300 | 2/5 | Brown-grey solution | Cut grass (light) |

Okra and chia had good solubility in cold water. The 4% solutions provided substantial viscosity and interesting texture. In some cases, the temperature and time also had an effect on the viscosity. The ingredients which were provided as a very fine, pollen-like powder often produced undesirable lump or a heterogeneous solution during shearing. Additionally, the chia seed in cold water presented difficulties with complete dispersion and also gave a heterogeneous mixture with lumps. The Okra B and flaxseed in hot water also presented difficulties with dispersion and/or heterogeneity.

Tables 2c and 2d show the viscosity measurements for psyllium solutions. The samples were prepared in cold water or hot water and some samples prepared in cold water were heated to 80° C. after the solution was prepared to evaluate the effect of temperature.

TABLE 2c

|  | t0 | t =+ 1 h | t =+ 36 h |
| --- | --- | --- | --- |
| 1% psyllium (cold) | 300 | 400 | Syneresis |
| 2% psyllium (cold) | 1600 | 2700 | 4700 |
| 2% psyllium(cold, then heated) | 2700 | — | — |
| 2% psyllium (hot) | 11000 | — | — |
| 3% psyllium (cold) | 25000 | — | — |
| 5% psyllium (cold) | 50000 | — | — |

TABLE 2d

| 2 wt % psyllium (cold) | 1600 | 2600 | — |
| --- | --- | --- | --- |
| 2 wt % psyllium (hot) | 11000 | 16600 | gel |
| 3 wt % psyllium (cold) | 25000 | 32500 | gel |

Psyllium solutions presented a brown-caramel color with a pleasant odor. The texture was very sticky (4/5 or 5/5) and led to the formation of a gel. All of the solutions prepared presented a similar cosmetic. Solutions with concentrations of psyllium below 2% were not viscous enough and solutions with greater than 5% were too viscous, even solid, with a homogeneous strongly elastic sticky paste that did not break easily. Thus, concentrations of 2-3 wt % of psyllium may provide the most useful application in a gravy or jelly alone. Lower concentrations of psyllium may be useful when used in a blend with other ingredients, such as fruit fiber. Compositions with 2-3 wt % psyllium formed gels in cold solutions. The weak gels are brittle. When the gel was broken, viscosity did not decrease. Viscosity significantly increased when the cold solution was heated.

Based on the results, psyllium may act as a replacement for starches in gravy or jelly food applications and could also eliminate the need to add caramel coloring.

Example 2-2: Blends of Citrus Fiber Okra

Blends of citrus fiber with okra were evaluated to see if they could provide a texture (viscosity), stickiness and cosmetic similar to current gravies used in wet pet food. The viscosities of compositions containing citrus fiber and okra in cold (T=15-30° C.) and hot water (T=75-95° C.) are reported in Table 2e. Viscosities were measured using a Brookfield RVT viscosimeter at 20 rpm and 25° C. (spindle 4).

TABLE 2e

|  |  | Cold Water | | Hot Water | |
| --- | --- | --- | --- | --- | --- |
|  | Composition | t = 0 | t =+ 5 h | t = 0 | t =+ 5 h |
| Okra A | 0.5 wt % Okra A + 2 wt % citrus fiber N | 2100 | 3200 | — | — |
|  | 1 wt % Okra A + 2 wt % citrus fiber N | 3300 | 2800 | 2900 | 6200 |
|  | 2 wt % Okra A + 2 wt % citrus fiber N | 7000 | 5500 | — | — |
| Okra B | 1 wt % Okra B + 2 wt % citrus fiber N | 2100 | 3600 | 2900 | 4400 |
|  | 2 wt % Okra B + 2 wt % citrus fiber N | 2900 | 3000 | — | — |

The blend of Okra A at 2% with citrus fiber at 2% in cold water showed the highest viscosity among the okra/citrus fiber blends although no gel formation was seen for any of the blends in Table 2e. The solution was a yellow-green solution with an herbal odor and a 3/5 degree of stickiness. Based on the properties of the okra/citrus fiber blends they would be most suited for use in gravy rather than in jelly in pet food, beverage or confectionary applications for example.

Example 2-3: Blends of Citrus Fiber with Psyllium

Blends of citrus fiber with psyllium were prepared and the physical properties of the mixtures were assessed. The citrus fiber powder and psyllium powder were added to cold water or hot water and mixed using a Silverson high shear mixer for 1-3 min at a speed of about 5000-7000 rpm. Some solutions were put in boiling water for about 10 min then cooled to room temperature for about 5-10 min. Viscosity results (measured at 25° C.) are presented in Table 2f TABLE 2f

| | Cold | | Cold + in boiling water for 10 minutes | | Hot | | Hot + in boiling water for 10 minutes | |
|---|---|---|---|---|---|---|---|---|
| | t0 | t =+ 3 h | t0 | t =+ 3 h | t0 | t =+ 3 h | t0 | t =+ 3 h |
| 1.5% citrus fiber + 0.5% psyllium | 1500 | 2400 | 1500 | 7000 | 1600 | 3500 | 3200 | 5000 |
| | No gel | | Weak gel | | Gel | | Gel | |
| 2% citrus fiber + 0.5% psyllium | 6500 | 6800 | 5500 | 9000 | 5200 | 9000 | 7000 | 10600 |
| | Strong gel w/syneresis | | Gel | | Strong gel | | Strong gel | |

Combinations of psyllium and citrus fiber were more viscous than either psyllium or citrus fiber alone. The blend of citrus fiber at 2 wt % and psyllium at 0.5 wt % provided a sticky solution and formed a gel which was brittle in cold water and elastic in hot water, but was easily broken. The viscosity was higher and the elastic gel formation stronger in hot water. Finally, the result was a sticky yellow-brown composition with the texture of apple puree without a strong odor.

Example 2-4: Blends of Citrus Fiber with Psyllium and $CaCO_3$

The effect of $CaCO_3$ addition on the citrus fiber/psyllium blend was evaluated. The samples was prepared by adding both powders to hot or cold water at the same time followed by solubilization with high shear mixer. Some cold water samples were also put in boiling water for 10 min and then allowed to cool at room temperature for 5-10 min. The viscosity of each solution was measured using a Brookfield RVT viscosimeter at 20 rpm, 25° C. using spindles 4 or 5. The viscosity measurements are reported in Tables 2g and 2h.

TABLE 2g

| | Cold | | Cold + in boiling water for 10 minutes | | Hot | | Hot + in boiling water for 10 minutes | |
|---|---|---|---|---|---|---|---|---|
| | t0 | t =+ 3 h | t0 | t =+ 3 h | t0 | t =+ 3 h | t0 | t =+ 3 h |
| 2% psyllium + 0.5% $CaCO_3$ | 6500 | 6500 | 9000 | 13000 | 8000-10000 | 10600 | 17400 | 14400 |

Blends of psyllium with $CaCO_3$ showed an increase in viscosity compared to psyllium solutions without $CaCO_3$. A brittle gel formed in cold water and a strong elastic gel formed in hot water. The solutions were also sticky (4/5 or 5/5). Putting solutions in boiling water for 10 minutes increased the viscosity in all cases.

TABLE 2h

| | Cold | | Cold + in boiling water for 10 minutes | | Hot | | Hot + in boiling water for 10 minutes | |
|---|---|---|---|---|---|---|---|---|
| | t0 | t =+ 3 h | t0 | t =+ 3 h | t0 | t =+ 3 h | t0 | t =+ 3 h |
| 2% citrus fiber N + 0.5% $CaCO_3$ | 4500 | 5700 | 5000 | 4000 | 6500 | 9200 | 6700 | 8000 |

The blends of citrus fiber with $CaCO_3$ showed higher viscosity than in the absence of $CaCO_3$. The citrus fiber did not show any gel formation with or without $CaCO_3$.

Blends of citrus fiber, psyllium and $CaCO_3$ were evaluated. To prepare the blends citrus fiber powder, psyllium powder and $CaCO_3$ were added at the same time to cold or hot water then solubilized using high shear for 1-3 minutes. Viscosities were measured as described for previous experiments and results are reported in Table 2i.

TABLE 2i

| | t0 | t =+ 1 h |
|---|---|---|
| 1.5% citrus fiber N + 0.5% psyllium + 0.5% $CaCO_3$ (cold) | 2500 | 2700 |
| 1.5% citrus fiber N + 0.5% psyllium + 0.5% $CaCO_3$ (hot) | 1500 | 2800 |

The blends of citrus fiber+psyllium+$CaCO_3$ did not lead to gel formation at the concentrations tested. Additionally, neither time nor temperature appeared to affect the viscosity.

Example 3-1 Fruit Fiber, Plant Polysaccharides, and Blends in Chunk and Gravy Products Fruit fiber, plant polysaccharides and combinations thereof were tested as hydrocolloid systems for chunk and gravy pet food compositions. Gravy compositions using fruit fiber and plant polysaccharides alone as well as gravy compositions with blends of fruit fiber and plant polysaccharides were prepared and evaluated for their physical and sensory properties. The gravies were generally prepared as describe above, solubilizing powders alone or in combination in cold water or hot water and in some cases solubilizing powders separately in cold and hot water then adding the cold water solution to the hot water solution and finally in some cases solubilizing powders in cold water or hot water. The chunk component of the chunk and gravy was obtained by washing and drying the chunks from commercially purchased chunk and gravy products (e.g. PURINA GOURMET PERLE).

After the gravy and chunks were prepared as described above, the chunks and gravy were combined and mixed. Cans were filled with the composition and weighed, lidded and sealed and retorted for 45 min at 120° C. Each can had a weight of 85 g (+/−1 g) with 60% gravy (51 g) and 40% chunks (34 g).

The viscosity, stickiness and sensory properties of the gravies prepared before mixing with chunks as described above is shown in Table 3a.

TABLE 3a

| Gravy | Description | Viscosity | Stickiness | Cosmetic |
|---|---|---|---|---|
| 1 | 2% citrus fiber N (cold) | 8000 | 3/5 | apple puree |
| 2 | 0.75% psyllium (hot) | 1500 | 4/5 | gravy |
| 3 | 1.5% citrus fiber N + 0.5% psyllium (hot) | 8000 | 5/5 | brittle gel |
| 4 | 1% citrus fiber N + 0.25% psyllium (hot) | 600 | 2/5 | solution |
| 5 | 1.5% citrus fiber N + 0.5% psyllium (cold) | 5700 | 5/5 | gravy/brittle gel syneresis |
| 6 | 1% citrus fiber N + 0.25% psyllium (cold) | 500 | 1/5 | solution |
| 7 | 1.5% citrus fiber N + 0.5% okra A (cold) | 1000 | 1/5 | solution |
| 8 | 1% citrus fiber N + 1% okra A (cold) | 400 | 2/5 | solution |

Gravies 2, 3, 4, 5, and 6 provided a good gravy cosmetic with similar functionalities to commercial chunk and gravy products.

Additional gravy recipes were prepared and evaluated as described above. Results are shown in Table 3b.

TABLE 3b

| Gravy | Description | Viscosity | Stickiness | Cosmetic |
|---|---|---|---|---|
| 1 | 1% psyllium (hot) | 7700 | 5+/5 | gel |
| 2 | 1% citrus fiber N + 0.5 psyllium (hot) | 2900 | 5+/5 | gravy |
| 3 | 1.5 citrus fiber N + 2% okra A (cold) | 1600 | 4/5 | gravy |
| 4 | 1.5% apple fiber A09 + 0.5% psyllium (cold) | 2300 | 1/5 | gravy |

Gravy 1 formed an elastic gel with good adhesion to the chunks. Gravy 2 had some syneresis. Gravy 3 was much less viscous. Gravy 4 had some syneresis and did not have an apple odor.

Gravies mixed with chunks and retorted confirmed the synergy of citrus/apple fiber with psyllium and can be used for products with good viscosity, stickiness & cosmetic similar to the Gourmet Perle GIG standard, composed of guar & xanthan. Thus, the blend of citrus fiber & psyllium could replace the two hydrocolloids, xanthan & guar.

Therefore, using fruit fibers, such as citrus and apple fibers, with plant-based polysaccharides like psyllium, okra, chia or flaxseed can provide a gravy and even a jelly with comparable performance, in terms of functionalities, as the current gravies. Consequently, these blends could replace hydrocolloids currently used and can be used in new recipes, with natural and clean labels.

The invention claimed is:

1. A method of preparing a hydrocolloid system, the method comprising:
    solubilizing a fruit fiber in a first water to prepare a fruit fiber solution;
    solubilizing a plant-based polysaccharide in a second water to prepare a polysaccharide solution, wherein a concentration of the plant-based polysaccharide in the polysaccharide solution is from about 0.25 wt % to about 1 wt %; and
    mixing the fruit fiber solution and the polysaccharide solution to prepare the hydrocolloid system comprising the fruit fiber and the plant-based polysaccharide.

2. A method of preparing a hydrocolloid system, the method comprising:
    solubilizing a fruit fiber in a first water to prepare a fruit fiber solution, wherein the solubilizing of the fruit fiber in the first water is conducted with a high shear mixer at about 5000-7000 rpm;
    solubilizing a plant-based polysaccharide in a second water to prepare a polysaccharide solution; and
    mixing the fruit fiber solution and the polysaccharide solution to prepare the hydrocolloid system comprising the fruit fiber and the plant-based polysaccharide.

3. A method of preparing a hydrocolloid system, the method comprising:
    solubilizing a fruit fiber in a first water to prepare a fruit fiber solution, wherein a concentration of the fruit fiber in the fruit fiber solution is from about 0.5 wt % to about 2 wt %;
    solubilizing a plant-based polysaccharide in a second water to prepare a polysaccharide solution; and
    mixing the fruit fiber solution and the polysaccharide solution to prepare the hydrocolloid system comprising the fruit fiber and the plant-based polysaccharide.

4. The method of claim 1, wherein the first water has a temperature from about 15° C. to about 30° C.

5. The method of claim 1, wherein the second water has a temperature from about 75° C. to about 95° C.

6. A method of preparing a hydrocolloid system, the method comprising:
    solubilizing a fruit fiber in a first water to prepare a fruit fiber solution;
    solubilizing a plant-based polysaccharide in a second water to prepare a polysaccharide solution; and
    mixing the fruit fiber solution and the polysaccharide solution to prepare the hydrocolloid system comprising the fruit fiber and the plant-based polysaccharide, wherein the mixing of the fruit fiber solution and the polysaccharide solution comprises pouring the fruit fiber solution into the polysaccharide solution.

7. The method of claim 1 further comprising sterilizing the hydrocolloid system.

8. The method of claim 1, wherein the fruit fiber comprises at least one of citrus fiber or apple fiber.

9. The method of claim 1, wherein the plant-based polysaccharide comprises at least one of psyllium, okra, seaweed, chia, flaxseed, or combinations thereof.

10. A method of preparing a hydrocolloid system, the method comprising:
  solubilizing a fruit fiber in a first water to prepare a fruit fiber solution;
  solubilizing a plant-based polysaccharide in a second water to prepare a polysaccharide solution, wherein the plant-based polysaccharide comprises seaweed, and the seaweed comprises at least one of *Eucheuma cottonii, Eucheuma spinosum, Grassialaria verrucosa, Chondrus crispus*, or combinations thereof; and
  mixing the fruit fiber solution and the polysaccharide solution to prepare the hydrocolloid system comprising the fruit fiber and the plant-based polysaccharide.

11. The method of claim 10, wherein a concentration of the seaweed in the polysaccharide solution is from about 0.1 wt % to about 2 wt %.

12. The method of claim 1, wherein the polysaccharide solution further comprises a calcium source.

13. A method of preparing a hydrocolloid system, the method comprising:
  solubilizing a fruit fiber in a first water to prepare a fruit fiber solution;
  solubilizing a plant-based polysaccharide in a second water to prepare a polysaccharide solution, wherein the polysaccharide solution further comprises a calcium source selected from the group consisting of $CaCl_2$ and $CaCO_3$; and
  mixing the fruit fiber solution and the polysaccharide solution to prepare the hydrocolloid system comprising the fruit fiber and the plant-based polysaccharide.

14. The method of claim 13, wherein a concentration of the calcium source is from about 0.1% to about 1%.

15. A method of preparing a hydrocolloid system, the method comprising:
  solubilizing a fruit fiber in a first water to prepare a fruit fiber solution;
  solubilizing a plant-based polysaccharide in a second water to prepare a polysaccharide solution, wherein the plant-based polysaccharide comprises psyllium, and a concentration of the psyllium in the polysaccharide solution is from about 0.1 wt % to about 2 wt %; and
  mixing the fruit fiber solution and the polysaccharide solution to prepare the hydrocolloid system comprising the fruit fiber and the plant-based polysaccharide.

16. A method of preparing a hydrocolloid system, the method comprising:
  solubilizing a fruit fiber in a first water to prepare a fruit fiber solution;
  solubilizing a plant-based polysaccharide in a second water to prepare a polysaccharide solution, wherein the plant-based polysaccharide comprises okra; and
  mixing the fruit fiber solution and the polysaccharide solution to prepare the hydrocolloid system comprising the fruit fiber and the plant-based polysaccharide.

17. The method of claim 16, wherein a concentration of the okra in the polysaccharide solution is from about 0.5 wt % to about 4 wt %.

18. The method of claim 1 further comprising adding a potassium source to the hydrocolloid system.

19. A method of preparing a hydrocolloid system, the method comprising:
  solubilizing a fruit fiber in a first water to prepare a fruit fiber solution;
  solubilizing a plant-based polysaccharide in a second water to prepare a polysaccharide solution;
  mixing the fruit fiber solution and the polysaccharide solution to prepare the hydrocolloid system comprising the fruit fiber and the plant-based polysaccharide; and
  adding a potassium source to the hydrocolloid system, wherein a concentration of the potassium source in the hydrocolloid system is from about 0.1 to about 2 wt %.

20. The method of claim 19, wherein the potassium source is selected from the group consisting of potassium chloride and potassium carbonate.

21. The method of claim 1, wherein the hydrocolloid system has a viscosity of greater than or equal to 2000 mPa·s.

22. The method of claim 1, wherein the hydrocolloid system has a viscosity from about 2000 mPa·s to about 6000 mPa·s.

* * * * *